(12) United States Patent
Williams et al.

(10) Patent No.: US 6,205,295 B1
(45) Date of Patent: Mar. 20, 2001

(54) CAMERA WITH FILM-DOOR-LOCK INDICATOR

(75) Inventors: Patricia L. Williams, Rochester; Dennis R. Zander, Penfield, both of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/565,312

(22) Filed: May 4, 2000

(51) Int. Cl.$^7$ .............................. G03B 17/36; G03B 1/00
(52) U.S. Cl. ........................... 396/284; 396/411; 396/538
(58) Field of Search .................................. 396/284, 535, 396/536, 537, 538, 411

(56) References Cited

U.S. PATENT DOCUMENTS

| | | | |
|---|---|---|---|
| 1,389,164 | 8/1921 | Roikjer | 396/536 |
| 2,903,952 | 9/1959 | Naumann | 396/536 |
| 4,149,793 | 4/1979 | Date | 396/405 |
| 4,334,753 | 6/1982 | Harvey | 396/210 |
| 4,707,096 | 11/1987 | Lawther | 396/392 |
| 4,896,180 | 1/1990 | Lawther | 396/536 |
| 5,473,401 | * 12/1995 | Tsunefuji et al. | 396/536 |
| 5,530,508 | 6/1996 | Fuss et al. | 396/538 |
| 5,565,951 | * 10/1996 | Tokui | 396/538 |
| 5,600,393 | * 2/1997 | Funahashi | 396/513 |
| 5,625,432 | * 4/1997 | Omi | 396/284 |

* cited by examiner

Primary Examiner—David M. Gray
(74) Attorney, Agent, or Firm—Roger A. Fields

(57) ABSTRACT

A camera comprising a cartridge receiving chamber for a film cartridge with a film leader that can be advanced from the film cartridge in preparation for film exposure and can be wound into the film cartridge after film exposure, a film door movable open to open the chamber and movable closed to close the chamber, and a door lock movable to lock the film door closed and movable to release the film door, is characterized in that a film sensor is originally positioned to be moved by the film leader as the film leader is advanced from the film cartridge, and a dual purpose indicator and blocker is connected to the film sensor to be moved to block the door lock from being moved to release the film door and to provide a visible indication when the film sensor is moved by the film leader, whereby the dual purpose indicator and blocker prevents the film door from being opened and warns that the film leader has been advanced from the film cartridge in preparation for film exposure.

8 Claims, 3 Drawing Sheets

CAMERA WITH FILM-DOOR-LOCK INDICATOR

FIELD OF THE INVENTION

The invention relates generally to the field of photography, and in particular to cameras. More specifically, the invention relates to a camera with a film-door-lock indicator.

BACKGROUND OF THE INVENTION

It is well known for a camera to have a cartridge receiving chamber for a film cartridge with a film leader that can be advanced from the film cartridge in preparation for film exposure and can be wound into the film cartridge after film exposure. Typically, a film door is movable open to open the chamber and is movable closed to close the chamber, and a door lock is movable to lock the film door closed and is movable to release the film door.

SUMMARY OF THE INVENTION

A camera comprising a cartridge receiving chamber for a film cartridge with a film leader that can be advanced from the film cartridge in preparation for film exposure and can be wound into the film cartridge after film exposure, a film door movable open to open the chamber and movable closed to close the chamber, and a door lock movable to lock the film door closed and movable to release the film door, is characterized in that:

a film sensor is originally positioned to be moved by the film leader as the film leader is advanced from the film cartridge; and a dual purpose indicator and blocker is connected to the film sensor to be moved to block the door lock from being moved to release the film door and to provide a visible indication when the film sensor is moved by the film leader, whereby the dual purpose indicator and blocker prevents the film door from being opened and warns that the film leader has been advanced from the film cartridge in preparation for film exposure.

DETAILED DESCRIPTION OF THE INVENTION

The invention is disclosed as being embodied preferably in a motorized film advance camera. Because the features of a motorized film advance camera are generally known, the description which follows is directed in particular only to those elements forming part of or cooperating directly with the disclosed embodiment. It is to be understood, however, that other elements may take various forms known to a person of ordinary skill in the art.

Figure 1:
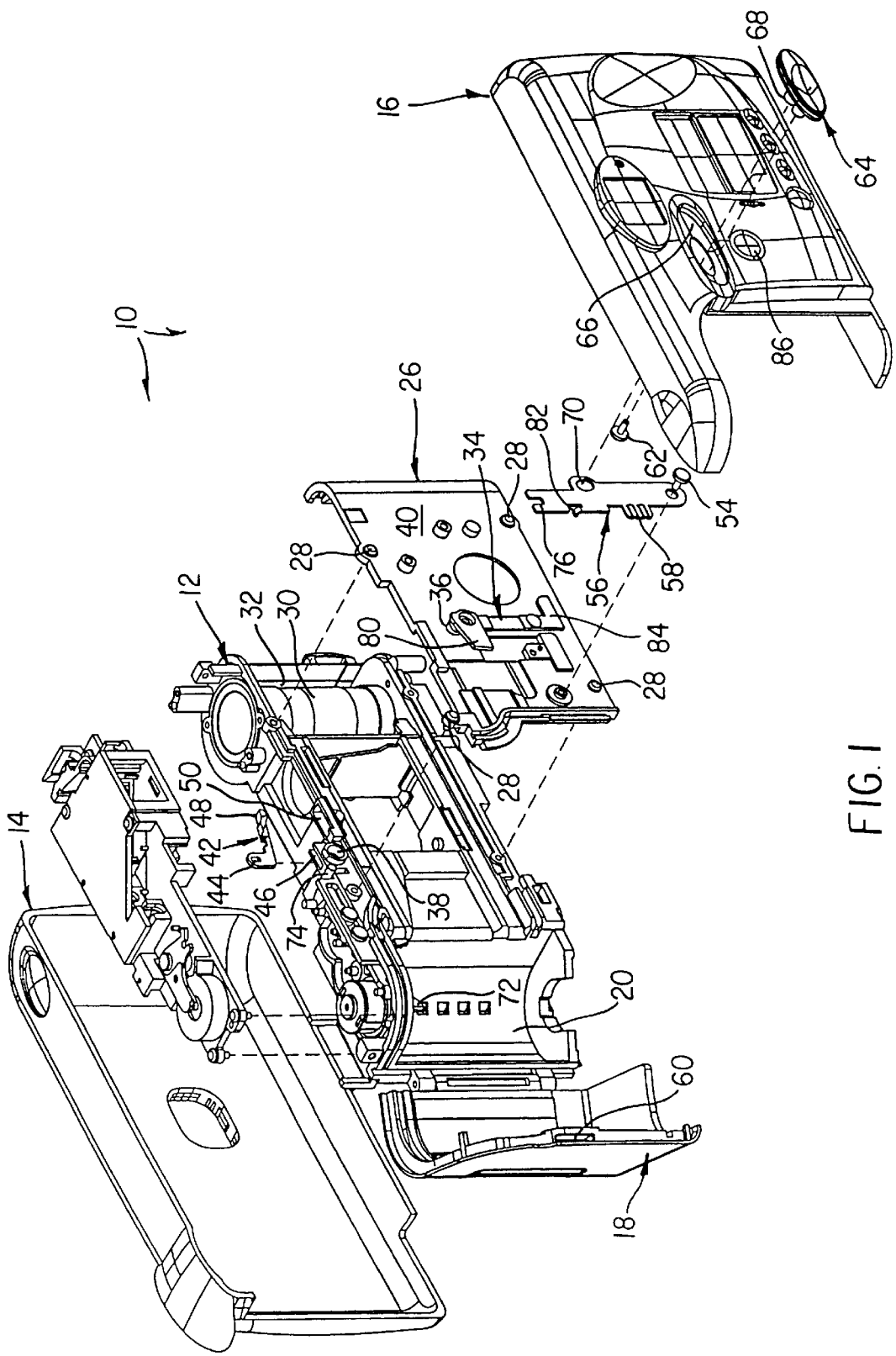
FIG. 1 is a rear exploded perspective view of a camera with a film-door-lock indicator according to a preferred embodiment of the invention.
Figure 2:
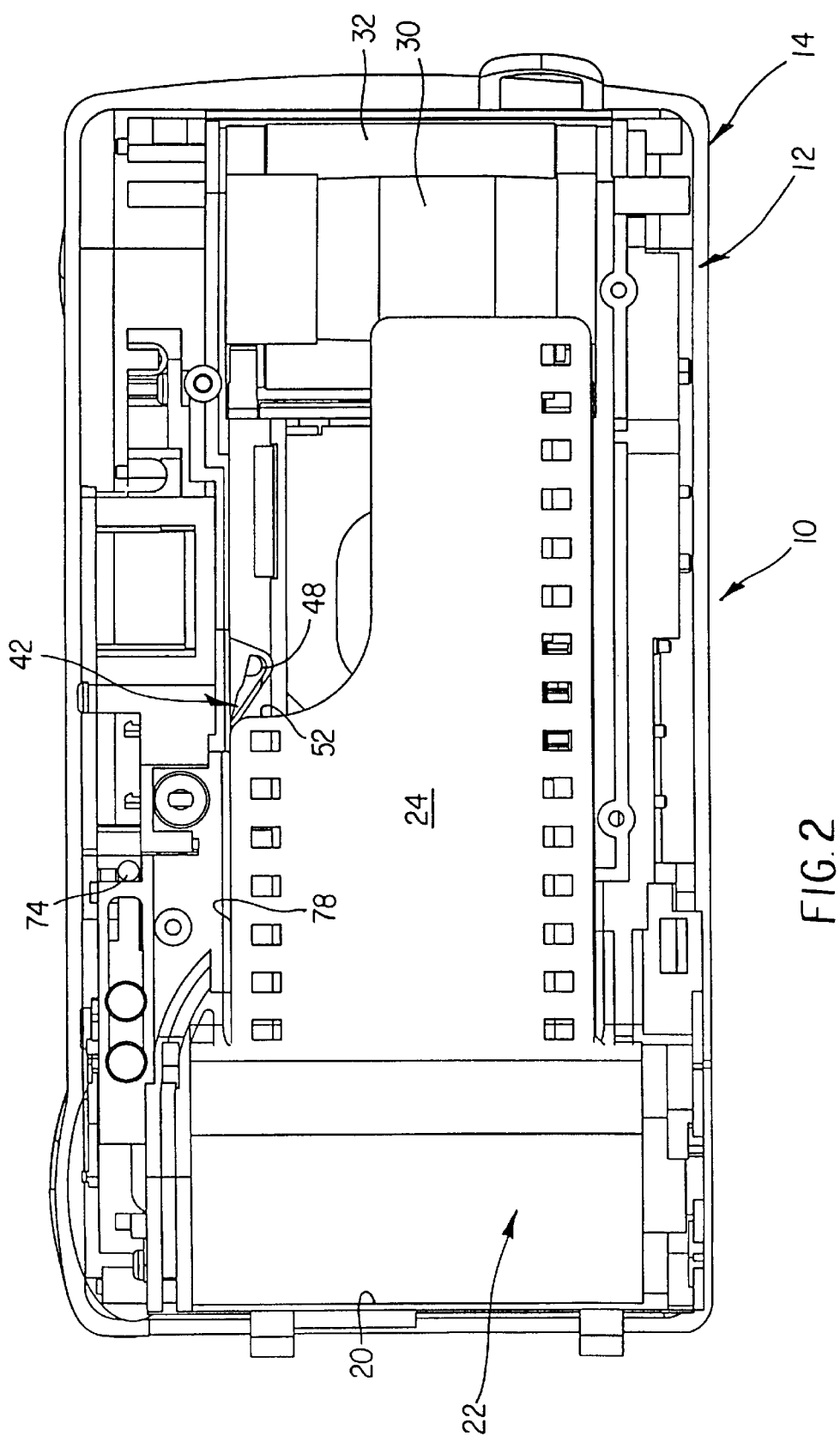
FIG. 2 is a rear elevation view of the camera shown with a rear cover part and a film pressure platen removed for clarity.

Referring now to the drawings, FIGS. 1 and 2 show a motorized film-advance camera 10 including a plastic opaque main body part 12, and a pair of plastic opaque front and rear housing parts 14 and 16 that contain the main body part.

As shown in FIG. 1, a film door 18 is pivotally connected to the main body 12 to be pivoted open to gain access to a cartridge receiving chamber 20 in the main body part and to be pivoted closed to close the chamber. The camera 10 is used with a conventional 35 mm film cartridge 22 having a originally protruding film leader 24. See FIGS. 2 and 3. Film loading in the camera 10 is accomplished by pivoting the film door 18 open, longitudinally inserting the film leader 24 into a slot (not shown) between the main body part 12 and a film pressure platen 26 secured via four fastening screws 28 to the main body part, pushing the film cartridge 22 into the cartridge receiving chamber 20, and closing the film door to start a motorized automatic film advance (not shown) in a film advance mode. As is known, the motorized automatic film advance in its film advance mode advances the film leader 24 beneath the film pressure platen 26, and onto a film take-up spool 30 in a film take-up chamber 32 in the main body part.

A dual purpose flag/blocking lever 34 between the rear housing part 16 and the film pressure platen 26 has a front cylindrical hub 36 that that projects into a rear bearing hole 38 in the main body part 12 to support the flag/blocking lever for pivotal movement over a rearward side 40 of the film pressure platen 26. The flag/blocking lever 34 is spring-biased to pivot clockwise in FIG. 1 by a known spring means (not shown). A film sensor 42 on the main body part 12 has one end 44 located in a top slot 46 in the main body part 12. The rear bearing hole 38 is open to the top slot 46, and the front cylindrical hub 36 of the flag/blocking lever 34 is coaxially connected to the end 44 of the film sensor 42 to make the flag/blocking lever and the film sensor pivot concurrently as a unit. Another end 48 of the film sensor 42 protrudes from a continuation 50 of the top slot 46 to be originally positioned ahead of a leading shoulder edge 52 of the film leader 24 as shown in FIG. 2.

A pivot pin 54 pivotally connects a door locking lever 56 between the pressure platen 26 and the rear cover part 16 to the film pressure platen 26 at the rearward side 40 of the film pressure platen. The door locking lever 56 is spring-biased to pivot counter-clockwise in FIG. 1 by a known spring means (not shown) and has a locking tab 58 that enters an edge slot 60 in the film door 18 to lock the film door closed when the door locking lever is pivoted counter-clockwise. As soon as the film door 18 is pivoted closed, the locking tab 58 will enter the edge slot 60. A retaining screw 62 secures a lock release button 64 for translation within an exterior recess 66 in the rear body part 16. A protuberance 68 on the lock release button 64 projects into a slot 70 in the door locking lever 56. When the lock release button 64 is manually translated to the right in FIG. 1, the protuberance 68 pivots the door locking lever 56 clockwise in FIG. 1 to retract the locking tab 58 from the edge slot 60, to permit the film door 18 to be pivoted open.

A film rewind spindle 72 is connected via a common linkage (not shown) to a movable pin 74 in a slot 76 in the door locking lever 56. When the door locking lever 56 is pivoted counter-clockwise in FIG. 1 to make the locking tab 58 enter the edge slot 60 in the film door 18, the pin 74 in the slot 76 causes the film rewind spindle 72 to be lowered into coaxial engagement with a film spool (not shown) in the film cartridge 22.

Figure 3:
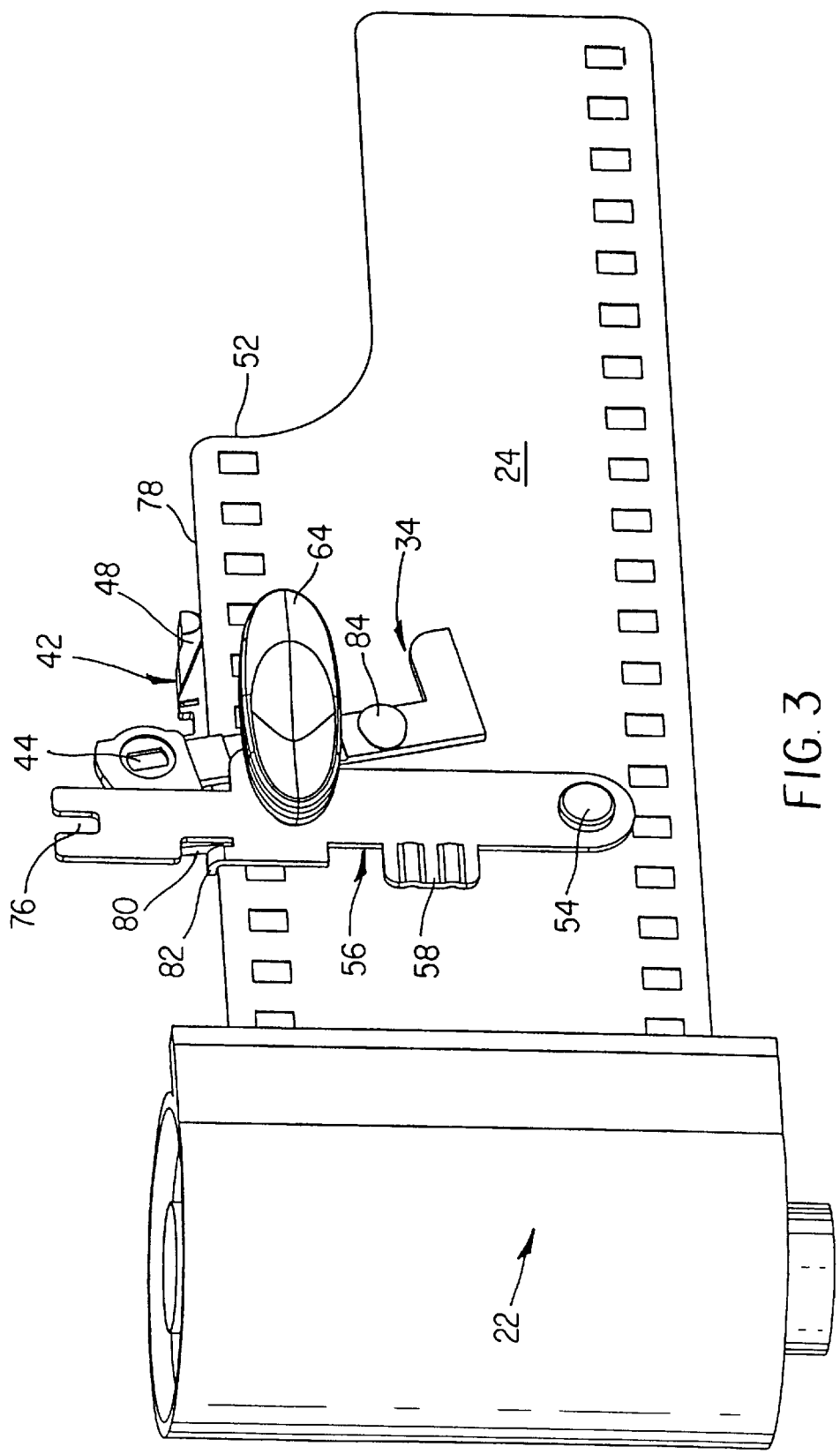
FIG. 3 is a rear elevation view of the film-door-lock indicator.

Closing the film door 18 to start the motorized automatic film advance in its film advance mode to advance the film leader 24 toward the film take-up spool 30 moves the leading shoulder edge 52 of the film leader 24 against the end 48 of the film sensor 42 to pivot the film sensor and the flag/blocking lever 34 counter-clockwise in FIGS. 1 and 2. The end 48 of the film sensor 42 comes to rest against a longitudinal edge 78 of the film leader 24 as shown in FIG. 3 (and it remains on that edge during normal film advance following each exposure and during film rewind following the last exposure). A blocking tab 80 on the pivoted lever 34 is swung counter-clockwise behind a protuberance 82 on the door locking lever 54 to prevent the pivoted lever from being pivoted clockwise via the lock release button 64. Simultaneously, a flag 84 on the pivoted lever 34 is moved into a window 86 in the rear cover part 16 to provide dual visible indications that the film door 18 is locked closed and that the film leader 24 has begun to be advanced toward the film take-up spool 30.

When substantially the entire film length is exposed, the motorized automatic film advance is started in a film rewind mode to rewind the film length (including the film leader 24) into the film cartridge 22. As soon as the longitudinal edge 78 of the film leader 24 is removed from the end 48 of the film sensor 42, the film sensor and the flag/blocking lever 34 are free to be pivoted clockwise in FIG. 3 via the known spring means that biases the flag/blocking lever to pivot clockwise. The blocking tab 80 on the pivoted lever 34 is swung clockwise from the protuberance 82 on the door locking lever 56 to permit the door locking lever to be pivoted clockwise in FIG. 1 via the lock release button 64. Simultaneously, the flag 84 on the pivoted lever 34 is removed from the window 86 in the rear cover part 16 to provide dual visible indications that the film door 18 can be unlocked and that the film length has been wound into the film cartridge 22.

Pivoting the door locking lever 56 clockwise in FIG. 1 retracts the film rewind spindle 72 from the film spool in the film cartridge 22. This permits the film cartridge 22 to be removed from the cartridge receiving chamber 20 when the film door 18 is pivoted open.

The invention has been described with reference to a preferred embodiment. However, it will be appreciated that variations and modifications can be effected by a person of ordinary skill in the art without departing from the scope of the invention.

PARTS LIST 10. camera
12. main body part
14. front cover part
16. rear cover part
18. film door
20. cartridge receiving chamber
22. film cartridge
24. film leader
26. film pressure platen
28. fastening screws
30. film take-up spool
32. film take-up chamber
34. dual purpose flag/blocking member
36. cylindrical hub
38. bearing hole
40. rearward side
42. film sensor
44. sensor end
46. top slot
48. sensor end
50. continuation slot
52. leading shoulder edge
54. pivot pin
56. door locking lever
58. locking tab
60. edge slot
62. retaining screw
64. lock release button
66. exterior recess
68. protuberance
70. slot
72. film rewind spindle
74. pin
76. slot
78. longitudinal edge
80. blocking tab
82. protuberance
84. flag
86. window

What is claimed is:

1. A camera comprising a main body part having a cartridge receiving chamber for a film cartridge with a film leader that can be advanced from the film cartridge in preparation for film exposure and can be wound into the film cartridge after film exposure, a rear housing part, a film pressure platen between said main body part and said rear cover part, a film door movable open to open said chamber and movable closed to close said chamber, and a door lock movable to lock said film door closed and movable to release said film door, is characterized in that:

a pivotal film sensor on said main body part is originally positioned to be moved by the film leader as the film leader is advanced from the film cartridge;

said door lock is pivotally connected to said pressure platen between said pressure platen and said rear cover part; and a pivotal dual purpose indicator and blocker between said rear housing part and said film pressure platen is coaxially connected to said film sensor to be moved to block said door lock from being moved to release said film door and to provide a visible indication when said film sensor is moved by the film leader, whereby said dual purpose indicator and blocker prevents said film door from being opened and warns that the film leader has been advanced from the film cartridge in preparation for film exposure.

2. A camera as recited in claim 1, wherein said film sensor is biased to return to an original position when the film leader is removed from said film sensor as the film leader is wound into the film cartridge, and said dual purpose indicator and blocker is returned with said film sensor to cease to block said door lock from being moved to release said film door and to cease to provide said visible indication.

3. A camera as recited in claim 1, wherein a film rewind spindle is coupled to said door lock to move to enable film rewind when said door lock is moved to lock said film door closed and to move to permit removal of the film cartridge from said cartridge receiving chamber when said door lock is moved to release said film door.

4. A camera as recited in claim 1, wherein a film pressure platen is located between said film sensor and said dual purpose indicator and blocker.

5. A camera as recited in claim 4, wherein said door lock and said dual purpose indicator and blocker are located at one side of said film pressure platen.

6. A camera as recited in claim 1, wherein said door lock is pivotally connected to a film pressure platen to be moved to lock said film door closed and to be moved to release said film door.

7. A camera as recited in claim 1, wherein said dual purpose indicator and blocker has a blocking tab that is moved behind a protuberance on said door lock to block said door lock from being moved to release said film door.

8. A camera as recited in claim 1, wherein said rear cover part has a window over said film pressure platen.

* * * * *